United States Patent [19]

Adam

[11] 4,301,082
[45] Nov. 17, 1981

[54] ANTHRAQUINONE COMPOUNDS

[75] Inventor: Jean-Marie Adam, St. Louis, France

[73] Assignee: Ciba-Geigy Corporation, Ardsley, N.Y.

[21] Appl. No.: 122,927

[22] Filed: Feb. 20, 1980

Related U.S. Application Data

[63] Continuation of Ser. No. 958,930, Nov. 8, 1978, abandoned.

[30] Foreign Application Priority Data

Nov. 14, 1977 [LU] Luxembourg .......................... 78509

[51] Int. Cl.$^3$ ......................................... C07C 143/665
[52] U.S. Cl. .................................... 260/373; 260/374
[58] Field of Search ................................ 260/373, 374

[56] References Cited

U.S. PATENT DOCUMENTS

| | | | |
|---|---|---|---|
| 2,022,889 | 12/1935 | Lauer | 260/576 |
| 2,580,190 | 12/1951 | Peter et al. | 260/373 |
| 4,224,228 | 9/1980 | Adam | 260/373 |

Primary Examiner—Winston A. Douglas
Assistant Examiner—Raymond K. Covington
Attorney, Agent, or Firm—John P. Spitals; Edward McC. Roberts

[57] ABSTRACT

There are described new anthraquinone compounds which, in the form of the free acid, correspond to the formula I

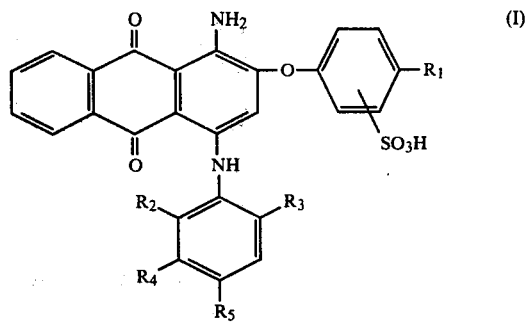

in which $R_1$ is a straight-chain or branched-chain alkyl group having 4 to 8 carbon atoms, $R_2$ and $R_3$ independently of one another are each a straight-chain or branched-chain alkyl group having 1 to 4 carbon atoms, $R_4$ is hydrogen, an optionally acylated amino group, or a fibre-reactive radical bound by way of an amino group, and $R_5$ is hydrogen, or a straight-chain or branched-chain alkyl group having 1 to 4 carbon atoms; and also the production thereof by selective desulfonation from an anthraquinonedisulfonic acid; and the use of the new anthraquinone compounds as dyes for dyeing and printing textile materials.

13 Claims, No Drawings

ANTHRAQUINONE COMPOUNDS

This is continuation of application Ser. No. 958,930 filed on Nov. 8, 1978 now abandoned.

The invention relates to new anthraquinone compounds, to processes for producing these compounds, to their use as dyes for dyeing or printing textile materials, particularly natural and synthetic polyamide materials, and also to the material treated with these new anthraquinone compounds.

Violet dyes which have good affinity for natural and synthetic polyamide material are in great demand. From the German Patent Specification No. 821,384 are known violet milling dyes of the anthraquinone series, but these dyes have poor substantivity on polyamide materials.

It has now been found that there are obtained by selective desulfonation of specific disulfonated anthraquinone compounds to monosulfoanthraquinone compounds violet anthraquinone compounds which, applied as dyes, surprisingly exhibit very good substantivity on polyamide material.

The invention hence relates to new anthraquinone compounds which, in the form of the free acid, correspond to the formula I

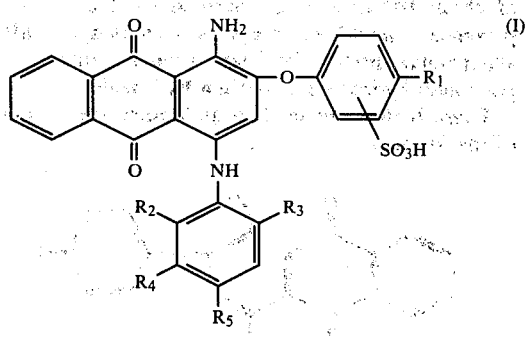

in which $R_1$ is a straight-chain or branched-chain alkyl group having 4 to 8 carbon atoms, $R_2$ and $R_3$ independently of one another are each a straight-chain or branched-chain alkyl group having 1 to 4 carbon atoms, $R_4$ is hydrogen, an optionally acylated amino group, or a fiber-reactive radical bound by way of an amino group, and $R_5$ is hydrogen, or a straight-chain or branched-chain alkyl group having 1 to 4 carbon atoms.

As a straight-chain or branched-chain alkyl group having 4 to 8 carbon atoms, $R_1$ is for example: the n-sec- or tert-butyl group; or the n-, sec- or tert-pentyl, -hexyl-, -heptyl- or -octyl group. In preferred anthraquinone compounds, $R_1$ is a branched-chain alkyl group having 4 to 8 carbon atoms, especially the tert-butyl group.

As a straight-chain or branched-chain alkyl group having 1 to 4 carbon atoms, $R_2$, $R_3$ and $R_5$ are each for example: the methyl, ethyl, n- and iso-propyl group or the n-, sec- and tert-butyl group. In preferred anthraquinone compounds, $R_2$ and $R_3$ are each the same straight-chain alkyl group having 1 to 4 carbon atoms, in particular each is the methyl group, and $R_5$ is a straight-chain alkyl group having 1 to 2 carbon atoms, especially the methyl group.

If $R_4$ is an amino group, this can be mono-substituted on the N atom; it is for example an alkylamino group, such as the methylamino or ethylamino group.

If $R_4$ is an acylated amino group, this corresponds in particular to the formula —NHCO—X or —NH-SO$_2$—X, wherein X is an alkyl group, especially the methyl group, or X is an aryl group, particularly the phenyl group.

When $R_4$ is an amino group to which a fiber-reactive radical is bound, $R_4$ corresponds to the formula —NHZ, wherein Z is a fiber-reactive radical.

By a fiber-reactive radical Z is meant a fiber-reactive radical which contains one or more reactive groups, or substituents that can be split off, and which, on application of the compounds to for example polyamide fibers, such as wool, is able to react with the NH groups of these fibers to form covalent bonds. Fiber-reactive groupings of this kind are known in large numbers from the literature.

Suitable fiber-reactive groupings Z which may be mentioned are for example those of the aliphatic series, such as the acryloyl group or the mono-, di- or trichloroacryloyl group or the mono-, di- or tribromoacryloyl group, such as —CO—CH=CH—Cl, —CO—CCl=CH$_2$, —CO—CH=CHBr, —CO—CBr=CH$_2$, —CO—CBr=CHBr or —CO—CCl=CH—CH$_3$, also —CO—CCl=CH—COOH, —CO—CH=CCl—COOH, β-chloropropionyl, 3-phenylsulfonylpropionyl, 3-methylsulfonylpropionyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1carbonyl, 2,2,3,3-tetrafluorocyclobutanecarbonyl-1 or -sulfonyl-1, the β-(2,2,3,3-tetrafluorocyclobutyl-1)- acryloyl group, or the α- or β-alkyl- or -arylsulfonylacryloyl group, such as α- or β-methylsulfonylacryloyl.

Reactive radicals suitable especially for polyamide, in particular for wool are: chloroacetyl, bromoacetyl, α,β-dichloro- or α,β-dibromopropionyl, α-chloro- or α-bromoacryloyl or 2,4,6-trifluoropyrimidyl-5 or 2,4,6-trifluorotriazinyl groups and also fluorotriazinyl groups of the formula

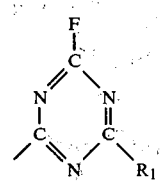

in which $R_1$ is an unsubstituted or substituted amino group, or an optionally etherified hydroxyl or thio group, such as the NH$_2$ group, an amino group mono- or di-substituted with C$_1$–C$_4$ alkyl groups, a C$_1$–C$_4$ alkoxy group, a C$_1$–C$_4$ alkylmercapto group, arylamino, especially phenylamino, or phenylamino substituted with methyl, methoxy, chlorine and in particular sulfo, phenoxy, mono- or disulfophenyloxy, and also dichlorotriazinylamino groups and derivatives thereof containing sulfo groups, such as

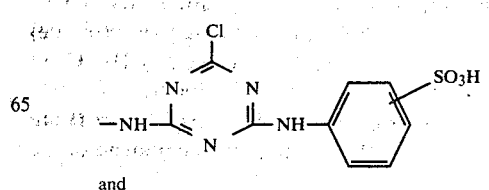

and

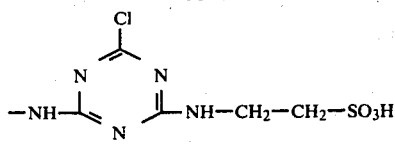

Particularly preferred reactive radicals Z are in particular the α-bromoacryloyl group and the α,β-dibromopropionyl group. The former can either be introduced with the aid of bromoacrylic acid chloride or obtained from the α,β-dibromopropionyl group by splitting off hydrogen bromide. The same applies also in the case of the α-chloroacrylic group. Likewise of interest is the 4,6-difluorotriazinyl-(2) group or the 4-fluoro-6-alkyl- or -arylaminotriazinyl-(2) group.

In preferred anthraquinone compounds of the formula I, $R_4$ is hydrogen.

A particularly interesting anthraquinone compound corresponds to the formula I in which $R_1$ is the tert-butyl group, $R_2$, $R_3$ and $R_5$ are each the methyl group, and $R_4$ is hydrogen.

The new anthraquinone compounds of the formula I are violet water-soluble compounds which are distinguished in particular by a good substantivity as well as good build-up properties and by pure shades on polyamide materials and by good fastness to wet processing, such as good fastness to hot water, perspiration and washing.

The new anthraquinone compounds of the formula I are obtained by a process in which an anthraquinone-disulfonic acid which, in the form of the free acid, corresponds to the formula II

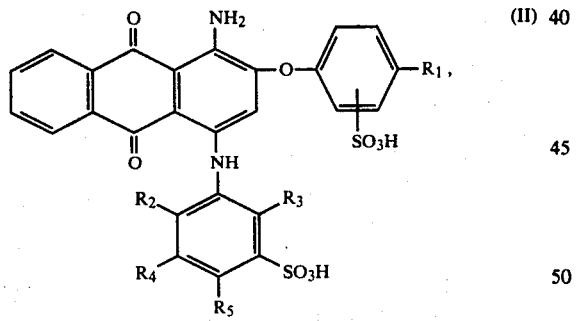

in which the symbols $R_1$, $R_2$, $R_3$, $R_4$ and $R_5$ have the aforesaid meanings, is desulfonated selectively in the phenylene ring in the 4-position, and if $R_4$ is an amino group this is then optionally reacted with a compound introducing an acyl group or a fiber-reactive radical.

The selective desulfonation is performed for example with 60 to 90%, preferably 80%, aqueous sulfuric acid, at a temperature of 80° to 120° C., particularly at 110° C., or by means of sulfolane (=tetra-methylenesulfone) at a temperature of 180 to 220° C., especially 210° C., in both cases in the course of 30 to 70 minutes.

The anthraquinone compounds of the formula II are obtained for example by reaction of a compound of the formula

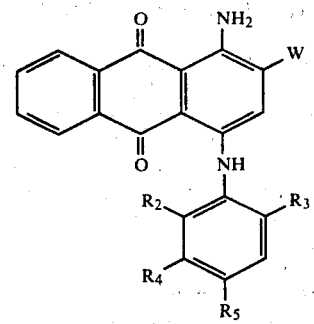

in which the symbols $R_2$, $R_3$, $R_4$ are $R_5$ have the aforesaid meanings, and W is the SO$_3$H group of halogen, especially bromine, with a p-alkylphenol of the formula

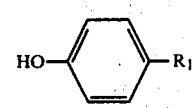

in which $R_1$ has the aforesaid meaning, at a temperature of about 180 to 240° C., particularly 220° C., in the presence of acid-binding agents, such as hydroxides of alkali metals, preferably of potassium or sodium, such as potassium hydroxide or sodium hydroxide.

There is thus obtained an anthraquinone compound of the formula

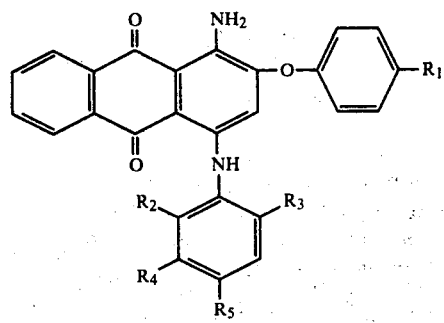

which is reacted by sulfonation with oleum containing 5 to 10% of free SO$_3$, at room temperature, to give a disulfonic acid of the formula II.

In the case where the radical $R_4$ in the anthraquinone compounds of the formula I is an acylated amino group or a fiber-reactive radical NHZ, it is advantageous to use as starting compound of the formula II a compound in which $R_4$ is an acylatable amino group and to selectively desulfonate this. The resulting compound is subsequently reacted with a compound introducing the acyl group or the fiber-reactive radical Z to give an acylated or fiber-reactive compound. Acyl compounds suitable for this purpose are for example those on which the stated reactive groups are based, in general halides, particularly chloride, of the components mentioned, and the condensation reaction is generally performed in an aqueous or organic medium and in the alkaline to acid range.

The new anthraquinone compounds of the formula I which are free from fiber-reactive groups are used as dyes for dyeing or printing in particular natural and synthetic polyamide materials, such as wool and nylon.

In the case of fiber-reactive anthraquinone compounds, these can be used for dyeing or printing cellulose materials or natural and synthetic polyamide materials, such as in particular wool, and for dyeing mixed fabrics, for example of wool and cellulose.

The following Examples illustrate the invention, but the invention is not limited to them. The term 'parts' denotes parts by weight, and tempertures are given in degrees Centigrade.

The intermediate products and the final compounds can be in the form of the free acid ($SO_3H$) or in the form of an alkali metal salt (Li, Na, K or $NH_4$).

EXAMPLE 1

50 Parts of 1-amino-2-p-tert-butylphenoxy-4-mesidinoanthraquinone of the formula

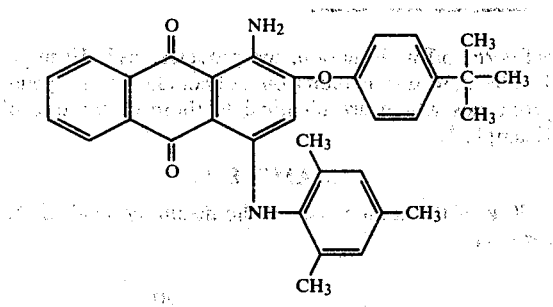

are dissolved in 500 parts of oleum containing 10% of $SO_3$, and stirring at 25° is maintained until thin-layer chromatography shows that no further starting material is present. There is thus obtained the disulfonic acid of the formula

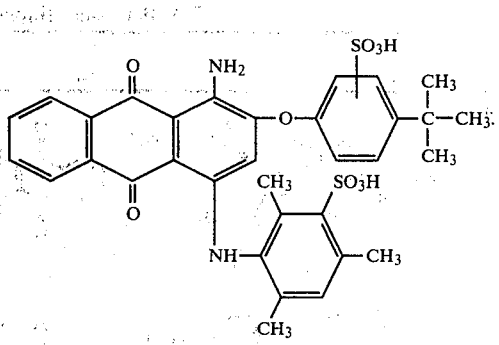

The sulfonation mixture is subsequently diluted with 130 parts of water, with the result that the concentration of $H_2SO_4$ is diluted to about 80%, with the temperature rising to 90°. The reaction mixture is heated and is stirred for a further 1 hour at 110°. The reaction mixture is then poured into a mixture of ice and water. The monosulfonic acid which has precipitated is filtered off with suction; it is suspended in 500 parts of water, and the pH value is adjusted to 7 with NaOH. An addition of 10 g of sodium chloride, is made in order to precipitate the sodium salt of the new dye of the formula

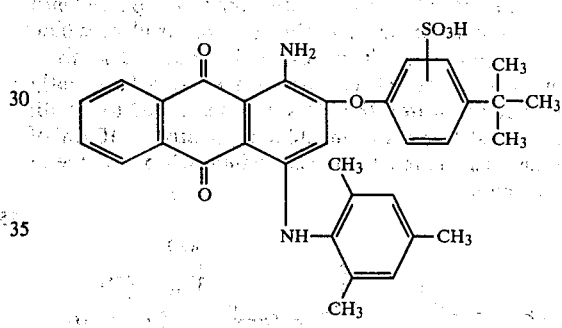

From a weakly acid bath, it is absorbed very well in violet shades onto a polyamide fibers, and the dyeings have excellent fastness to wet processing.

If there is used, instead of the 1-amino-2-p-tert-butylphenoxy-4-mesidinoanthraquinone mentioned in the foregoing, equivalent amounts of one of the condensation products listed in column II of Table 1, with the procedure otherwise remaining the same, there are obtained monosulfonated dyes of which the shades on polyamide are shown in the last column of the Table.

TABLE 1

| Example | Condensation product | Dye | Shade on polamide |
|---|---|---|---|
| 2 | (anthraquinone with $NH_2$, O-phenyl-t-butyl, $C_2H_5$, NH-phenyl with $C_2H_5$, $C_2H_5$) | (same with $SO_3H$ on phenyl-t-butyl) | violet |
| 3 | (anthraquinone with $NH_2$, O-phenyl-t-butyl, $CH_3$, NH-phenyl with $C_2H_5$) | (same with $SO_3H$ on phenyl-t-butyl) | violet |

TABLE 1-continued

| Example | Condensation product | Dye | Shade on polamide |
|---|---|---|---|
| 4 | 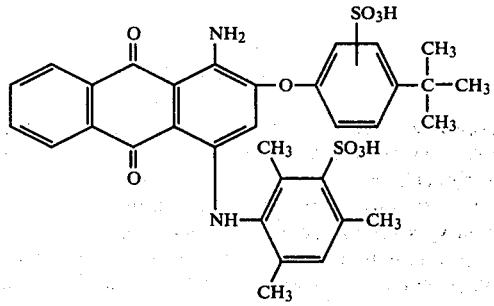 | 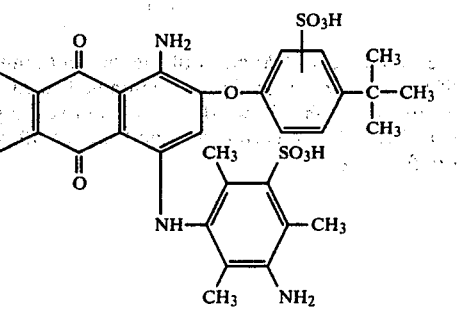 | bluish-violet |
| 5 | 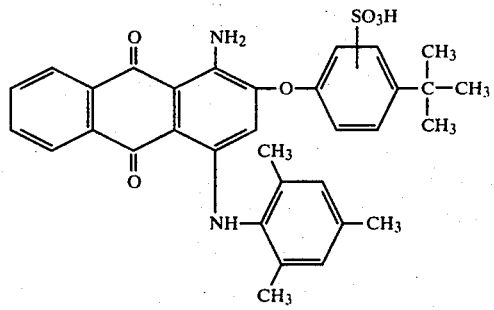 | 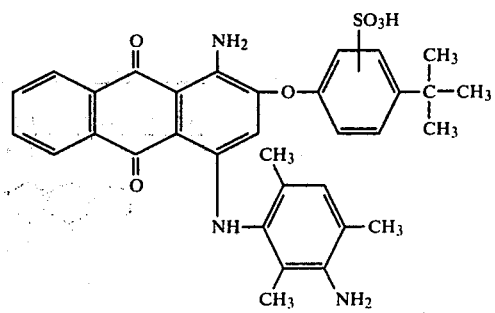 | bluish-violet |

EXAMPLE 6

50 Parts of 1-amino-2-p-tert-butylphenoxy-4-mesidino anthraquinone are dissolved in 500 parts of oleum containing 10% of SO₃, and stirring is maintained for 4 hours at 25°. The sulfonation mixture is poured into an ice/water mixture, and the reaction product which has precipitated is filtered off with suction. The disulfonic acid obtained in this manner is subsequently suspended in water, the pH value is adjusted to 7 with NaOH, and 25 g of sodium chloride, relative to 100 ml of the suspension are added. The sodium salt of the dye of the formula is obtained, which is filtered off with suction and dried.

50 Parts of this dye are suspended in 200 parts of sulfolane at 210° for 1 hour. The reaction mixture is diluted with 500 parts of water, and 20 parts of concentrated hydrochloric acid are added at 40°. The precipitated monosulfonic acid of the formula is filtered off with suction, and processed as in Example 1. The new dye exhibits on polyamide fibers dyeing properties which are identical to those of the dye of Example 1.

EXAMPLE 7

80 g of the sodium salt of the disulfonic acid of the formula is suspended in 300 parts of sulfolane at 210° for 1 hour. The reaction mixture is diluted with 700 parts of water, and 30 parts of concentrated hydrochloric acid is added at 40°. The monosulfonic acid of the formula which has precipitated is filtered off with suction and dried.

6 Parts of this anthraquinone base are dissolved in 60 parts of water at pH 7. There is then added dropwise at 15 to 20°, in the course of 10 minutes, 1 part of acetyl chloride, the pH value of the reaction mixture being held at 6.5 to 7.5 by the addition of a 5% sodium hydroxide solution, and the reaction mixture is stirred for a further 3 hours at 15 to 20. An addition of 10 g of sodium chloride per 100 ml solution is made to precipitate the acylated dye of the formula

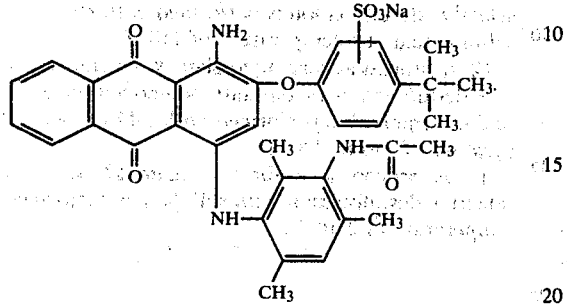

There is obtained a water-soluble, bluish-violet powder which exhibits on polyamide a very good exhaustion property.

By replacing in the above Example 1 part of acetyl chloride by 2 parts of dibromopropionyl chloride, there is obtained the dye of the formula

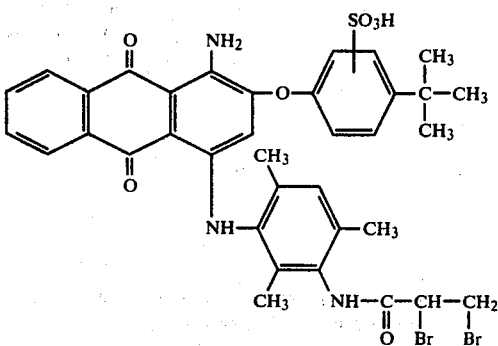

which exhibits on wool excellent fastness to wet processing.

EXAMPLE 8

A dye bath is prepared from 4000 parts of water, 4 parts of ammonium acetate, 2 parts of a dye according to Example 1, and sufficient acetic acid to bring the pH value to 6.5. 100 parts of a synthetic polyamide tricot are introduced into the dye bath obtained; the bath is heated within half an hour to the boiling temperature, and the material is dyed at 100° for 45 minutes. A deeply coloured violet dyeing is obtained.

I claim:

1. A new anthraquinone compound which, in the form of the free acid, corresponds to the formula I

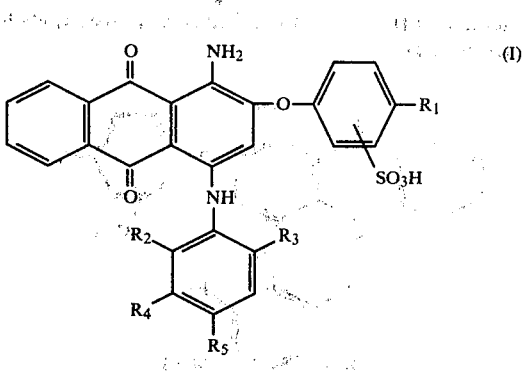

in which $R_1$ is a straight-chain or branched-chain alkyl-group having 4 to 8 carbon atoms, $R_2$ and $R_3$ independently of one another are each a straight-chain or branched-chain alkyl group having 1-4 carbon atoms, $R_4$ is hydrogen, an optionally acylated amino grup or a fiber-reactive radical bound by way of an amino group, and $R_5$ is hydrogen, or a straight-chain or branched-chain alkyl group having 1 to 4 carbon atoms.

2. A new anthraquinone compound according to claim 1, wherein $R_1$ is a branched-chain alkyl group having 4 to 8 carbon atoms.

3. A new anthraquinone compound according to claim 2, wherein $R_1$ is the tert-butyl group.

4. A new anthraquinone compound according to claim 1, wherein $R_2$ and $R_3$ are each the same straight-chain alkyl group having 1 to 4 carbon atoms.

5. A new anthraquinone compound according to claim 4, wherein $R_2$ and $R_3$ are each the methyl group.

6. A new anthraquinone compound according to claim 1, wherein $R_4$ is hydrogen.

7. A new anthraquinone compound according to claim 1, wherein $R_5$ is straight-chain alkyl group having 1 to 2 carbon atoms, particularly the methyl group.

8. A new anthraquinone compound according to claim 1, wherein $R_1$ is the tert-butyl group, $R_2$, $R_3$ and $R_5$ are each the methyl group, and $R_4$ is hydrogen.

9. A process for producing new anthraquinone compounds which, in the form of the free acid, correspond to the formula I

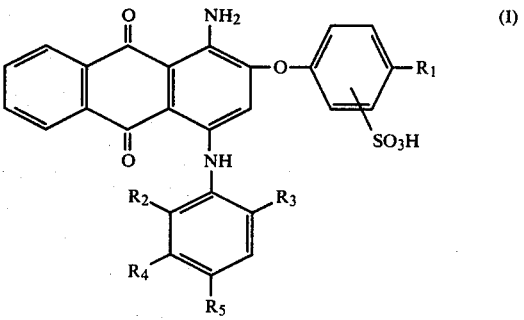

in which $R_1$ is a straigh-chain or branched-chain alkyl group having 4 to 8 carbon atoms, $R_2$ and $R_3$ independently of one antoher are each a straight-chain or branched-chain alkyl group having 1 to 4 carbon atoms, $R_4$ is hydrogen, an optionally acylated amino group, or a fiber-reactive radical bound by way of an amino group, and $R_5$ is hydrogen, or a straigh-chain or branched-chain alkyl group having 1 to 4 carbon atoms, in which process an anthraquinonedisulfonic acid which, in the form of the free acid, corresponds to the formula II

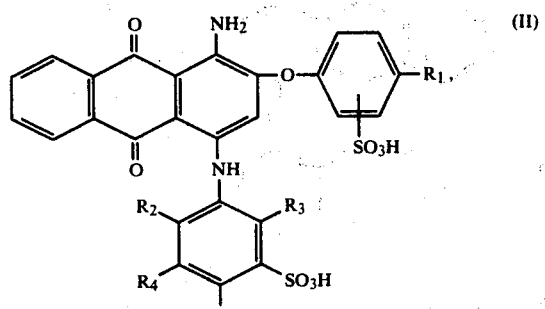

in which the symbols $R_1$, $R_2$, $R_3$, $R_4$ and $R_5$ have the aforesaid meanings, is desulfonated selectively in the phenylene ring in the 4-position, and if $R_4$ is an amino group this is then optionally reacted with a compound introducing an acyl group or a fiber-reactive radical.

10. A process according to claim 9, wherein the selective desulfonation of the anthraquinonedisulfonic acid of the formula II is performed with 60 to 90% aqueous sulfuric acid at a temperature of 80 to 120° C.

11. A process according to claim 10, wherein the selective desulfonation is performed with 80% aqueous sulfuric acid at a temperature of 110° C.

12. A process according to claim 9, wherein the selective desulfonation of the anthraquinonedisulfonic acid of the formula II is performed with sulfonlane at a temperature of 180 to 220° C.

13. A process according to claim 12, wherein the selective desulfonation with sulfolane is performed at a temperature of 210° C.

* * * * *